(12) United States Patent
Asano et al.

(10) Patent No.: US 10,348,174 B2
(45) Date of Patent: Jul. 9, 2019

(54) ELECTRIC MOTOR

(71) Applicants: DAIKIN INDUSTRIES, LTD., Osaka-shi, Osaka (JP); Nagoya Institute of Technology, Nagoya-shi, Aichi (JP)

(72) Inventors: Yoshinari Asano, Kusatsu (JP); Takashi Kosaka, Nagoya (JP)

(73) Assignees: Daikin Industries, Ltd., Osaka (JP); Nagoya Institute of Technology, Aichi (JP)

( * ) Notice: Subject to any disclaimer, the term of this patent is extended or adjusted under 35 U.S.C. 154(b) by 287 days.

(21) Appl. No.: 15/500,014

(22) PCT Filed: Jun. 19, 2015

(86) PCT No.: PCT/JP2015/067674
§ 371 (c)(1),
(2) Date: Jan. 27, 2017

(87) PCT Pub. No.: WO2016/017317
PCT Pub. Date: Feb. 4, 2016

(65) Prior Publication Data
US 2017/0250594 A1    Aug. 31, 2017

(30) Foreign Application Priority Data

Jul. 30, 2014   (JP) .................... 2014-154549

(51) Int. Cl.
*H02K 1/00*        (2006.01)
*H02K 19/12*       (2006.01)
(Continued)

(52) U.S. Cl.
CPC .............. *H02K 19/12* (2013.01); *H02K 1/16* (2013.01); *H02K 1/17* (2013.01); *H02K 21/04* (2013.01); *H02K 21/38* (2013.01); *H02K 21/44* (2013.01)

(58) Field of Classification Search
CPC ........... H02K 19/12; H02K 1/16; H02K 1/17; H02K 21/04; H02K 21/02; H02K 21/44
(Continued)

(56) References Cited

U.S. PATENT DOCUMENTS 6,621,190 B1   9/2003   Asao et al.
6,707,211 B2   3/2004   Oohashi et al.
(Continued)

FOREIGN PATENT DOCUMENTS

CN   1489259 A   4/2004
CN   1738153 A   2/2006
(Continued)

OTHER PUBLICATIONS

International Preliminary Report of corresponding PCT Application No. PCT/JP2015/067674 dated Jan. 31, 2017.
(Continued)

*Primary Examiner* — Thanh Lam
(74) *Attorney, Agent, or Firm* — Global IP Counselors, LLP

(57) ABSTRACT

An electric motor includes a rotor and a stator including a stator core, a plurality of armature windings, a plurality of field windings, and a plurality of bonded magnets. The stator core has a plurality of teeth alternately defining field slots and armature slots along a circumferential direction, and a stator yoke magnetically coupling the plurality of teeth opposite the rotor. Each armature winding is wound around two of the teeth sandwiched between an adjacent pair of the armature slots. Each field winding is wound around two of
(Continued)

the teeth sandwiched between an adjacent pair of the field slots. The magnets are individually located in the field slots while opposing the field windings in the radial direction. Each adjacent pair of the magnets along the circumferential direction respectively has an adjacent pair of pole surfaces, with the adjacent pair of pole surfaces having a same polarity.

10 Claims, 7 Drawing Sheets

(51) Int. Cl.
    *H02K 21/04*     (2006.01)
    *H02K 21/44*     (2006.01)
    *H02K 1/16*      (2006.01)
    *H02K 1/17*      (2006.01)
    *H02K 21/38*     (2006.01)

(58) Field of Classification Search
    USPC ... 310/154.02, 154.11, 181, 49.46, 166, 168, 310/254.1, 179–180, 46
    See application file for complete search history.

(56) References Cited

U.S. PATENT DOCUMENTS

| | | | |
|---|---|---|---|
| 8,847,522 B2 | 9/2014 | Nashiki et al. | |
| 2003/0122440 A1* | 7/2003 | Horst | H02K 21/04 310/181 |
| 2009/0091198 A1* | 4/2009 | Husband | H02K 21/44 310/46 |
| 2010/0038978 A1 | 2/2010 | Hoang et al. | |
| 2010/0072832 A1* | 3/2010 | Zhu | H02K 21/44 310/49.46 |
| 2011/0260672 A1* | 10/2011 | Ramu | H02K 21/44 318/701 |
| 2013/0049494 A1* | 2/2013 | Jung | H02K 21/44 310/46 |
| 2013/0134805 A1* | 5/2013 | Jung | H02K 21/44 310/46 |
| 2016/0118848 A1* | 4/2016 | Raminosoa | H02K 1/02 310/154.01 |

FOREIGN PATENT DOCUMENTS

| | | |
|---|---|---|
| CN | 101277053 A | 10/2008 |
| CN | 103051139 A | 4/2013 |
| JP | 2000-83338 A | 3/2000 |
| JP | 2003-32933 A | 1/2003 |
| JP | 2004-222458 A | 8/2004 |
| JP | 2010-268632 A | 11/2010 |
| JP | 2013-201869 A | 10/2013 |

OTHER PUBLICATIONS

International Search Report of corresponding PCT Application No. PCT/JP2015/067674 dated Aug. 25, 2015.
E. Hoang, M. Lecrivain, M. Gabsi, "A New Structure of a Switching Flux Synchronous Polyphased Machine With Hybrid Excitation", Power Electronics and Applications, 2007 European Conference on, IEEE, 2007, pp. 1-8.
E. Hoang, S. Hlioui, M. Lecrivain, M. Gabsi, "Experimental Comparison of Lamination Material Case of Switching Flux Synchronous Machine With Hybrid Excitation", Power Electronics and Applications, 2009. EPE '09, 13th European Conference on, IEEE, 2009, pp. 1-7.
Matsumoto, Kosaka, Matsui, Fujitsuna, "Design Studies on High Torque Flux Switching Motors With Hybrid Field Excitation", The Papers of Technical Meeting on Vehicle Technology, IEE Japan, 2012, pp. 31-36.

\* cited by examiner

ELECTRIC MOTOR

CROSS-REFERENCE TO RELATED APPLICATIONS

This U.S. National stage application claims priority under 35 U.S.C. § 119(a) to Japanese Patent Application No. 2014-154546, filed in Japan on Jul. 30, 2014, the entire contents of which are hereby incorporated herein by reference.

TECHNICAL FIELD

The present invention relates to electric motors, and more particularly, to an electric motor including a stator including armature windings, field windings, and field magnets.

BACKGROUND ART

Japanese Patent Application Laid-Open No. 2013-201869, Specification of United States Patent Application Publication No. 2010/0038978, E. Hoang, M. Lecrivain, M. Gabsi, "A NEW STRUCTURE OF A SWITCHING FLUX SYNCHRONOUS POLYPHASED MACHINE WITH HYBRID EXCITATION", Power Electronics and Applications, 2007 European Conference on, IEEE, 2007, pp. 1-8, E. Hoang, S. Hlioui, M. Lecrivain, M. Gabsi, "EXPERIMENTAL COMPARISON OF LAMINATION MATERIAL CASE OF SWITCHING FLUX SYNCHRONOUS MACHINE WITH HYBRID EXCITATION", Power Electronics and Applications, 2009 EPE '09, 13th European Conference on, IEEE, 2009, pp. 1-7 and Matsumoto, Kosaka, Matsui, Fujitsuna, "DESIGN STUDIES ON HIGH TORQUE FLUX SWITCHING MOTORS WITH HYBRID FIELD EXCITATION", The Papers of Technical Meeting on Vehicle Technology, IEE Japan, 2012, pp. 31-36 describe electric motors. The electric motor described in each of the documents above includes a stator and a rotor, where the rotor faces the stator with an air gap therebetween in a radial direction. The stator is provided with a stator core including teeth and a yoke, field magnets, field windings, and armature windings. In such an electric motor, the sum of magnetic fluxes of the field windings and magnetic fluxes of the field magnets acts as a field magnetic flux.

In particular, according to Matsumoto, Kosaka, Matsui, Fujitsuna, "DESIGN STUDIES ON HIGH TORQUE FLUX SWITCHING MOTORS WITH HYBRID FIELD EXCITATION", The Papers of Technical Meeting on Vehicle Technology, IEE Japan, 2012, pp 31-36, the teeth are provided in which field slots and armature slots are alternately formed. The field winding is wound around two teeth sandwiched between the field slots adjacent to each other circumferentially. The armature winding is wound around two teeth sandwiched between the armature slots adjacent to each other circumferentially. The field magnet is arranged in the field slot.

Japanese Patent Application Laid-Open No. 2004-222458 is also presented regarding the present invention, in particular, a field winding of the present invention.

SUMMARY

Problem to be Solved by the Invention

According to Japanese Patent Application Laid-Open No. 2013-201869, Specification of United States Patent Application Publication No. 2010/0038978, E. Hoang, M. Lecrivain, M. Gabsi, "A NEW STRUCTURE OF A SWITCHING FLUX SYNCHRONOUS POLYPHASED MACHINE WITH HYBRID EXCITATION", Power Electronics and Applications, 2007 European Conference on, IEEE, 2007, pp. 1-8, E. Hoang, S. Hlioui, M. Lecrivain, M. Gabsi, "EXPERIMENTAL COMPARISON OF LAMINATION MATERIAL CASE OF SWITCHING FLUX SYNCHRONOUS MACHINE WITH HYBRID EXCITATION" Power Electronics and Applications, 2009, EPE '09, 13th European Conference on, IEEE, 2009, pp. 1-7 and Matsumoto, Kosaka Matsui, Fujitsuna, "DESIGN STUDIES ON HIGH TORQUE FLUX SWITCHING MOTORS WITH HYBRID FIELD EXCITATION". The Papers of Technical Meeting on Vehicle Technology, IEE Japan, 2012, pp. 31-36, an eddy current is generated in the field magnet due to a magnetic flux flowing through the field magnet. Such an eddy current is not preferable from a viewpoint of the efficiency of an electric motor.

The present invention therefore has an object to provide an electric motor capable of reducing an eddy current of a field magnet.

Means to Solve the Problem

A first aspect of an electric motor according to the present invention includes a rotor (10) and a stator (20) facing each other with an air gap therebetween in a radial direction about an axis of rotation (P). The stator includes a stator core (21), a plurality of armature windings (24), a plurality of field windings (23), and a plurality of bonded magnets (22) for field magnets. The stator core (21) includes a plurality of teeth (211) and a stator yoke (212). The plurality of teeth (211) alternately define field slots (213a) and armature slots (213b) in a circumferential direction about the axis of rotation. The stator yoke (212) magnetically couples the teeth opposite the rotor. The plurality of armature windings (24) are each wound around two of the teeth (211b) sandwiched between adjacent two of the armature slots (213b) in the circumferential direction. The plurality of field windings (23) are wound around two of the teeth (211a) sandwiched between adjacent two of the field slots (213a) in the circumferential direction. The plurality of bonded magnets (22) are individually located in the field slots while opposing the field windings in the radial direction. Adjacent two of the plurality of bonded magnets in the circumferential direction respectively have adjacent two pole surfaces. The two pole surfaces have the same polarity.

In a second aspect of the electric motor according to the present invention, in the electric motor according to the first aspect, the bonded magnets (22) are in close contact with the teeth (211) in the circumferential direction.

In a third aspect of the electric motor according to the present invention, in the electric motor according to the first or second aspect, a magnet hole (216) of each of the field slots (213a) in which each of the bonded magnets (22) is arranged is surrounded by the stator core (21) when viewed along the axis of rotation.

In a fourth aspect of the electric motor according to the present invention, in the electric motor according to any one of the first to third aspects, the field windings (23) are opposite to the rotor (10) with respect to the bonded magnets (22). The stator core (21) further includes a coupling portion (215) coupling adjacent teeth of the teeth (211) in the circumferential direction between each of the field windings and each of the bonded magnets in the radial direction. Each of the field windings (23) includes a plurality of conductors passing through the field slots (213a) adjacent to each other in the circumferential direction and having opposite ends at one side in a direction extending along the axis of rotation. One end of one of the conductors is coupled with one end of the other of the conductors.

In a fifth aspect of the electric motor according to the present invention, in the electric motor according to the first or second aspect, the bonded magnets (22) are in close contact with the field windings (23) in the radial direction.

In a sixth aspect of the electric motor according to the present invention, in the electric motor according to the fifth aspect, each of the field windings (23) comprises a lead wire having a rectangular section.

Effects of the Invention

According to the first aspect of the electric motor of the present invention, an eddy current in the bonded magnet can be reduced.

According to the second aspect of the electric motor of the present invention, a reduction in the magnetic flux of the bonded magnet can be prevented or reduced.

According to the third aspect of the electric motor of the present invention, the shape of a mold can be simplified in the formation of a bonded magnet through injection molding.

According to the fourth aspect of the electric motor of the present invention, field windings can be attached to the field slots easily even when the field slots are surrounded by the rotor core (the coupling portion, teeth, and the stator yoke) when viewed along the axial direction.

According to the fifth aspect of the electric motor of the present invention, winding collapse of the field winding can be prevented or reduced.

According to the sixth aspect of the electric motor of the present invention, the bonded magnet is in close contact with the field winding in a more planar manner than in the case where the field winding is formed by a lead wire having a circular section. A stress generated in the bonded magnet can thus be reduced more than the bonded magnet that penetrates between adjacent lead wires in the case where the field winding is formed of a lead wire having a circular section.

These and other objects, features, aspects and advantages of the present invention will become more apparent from the following detailed description of the present invention when taken in conjunction with the accompanying drawings.

DESCRIPTION OF EMBODIMENTS

First Embodiment

Overall Configuration of Armature

Figure 1:
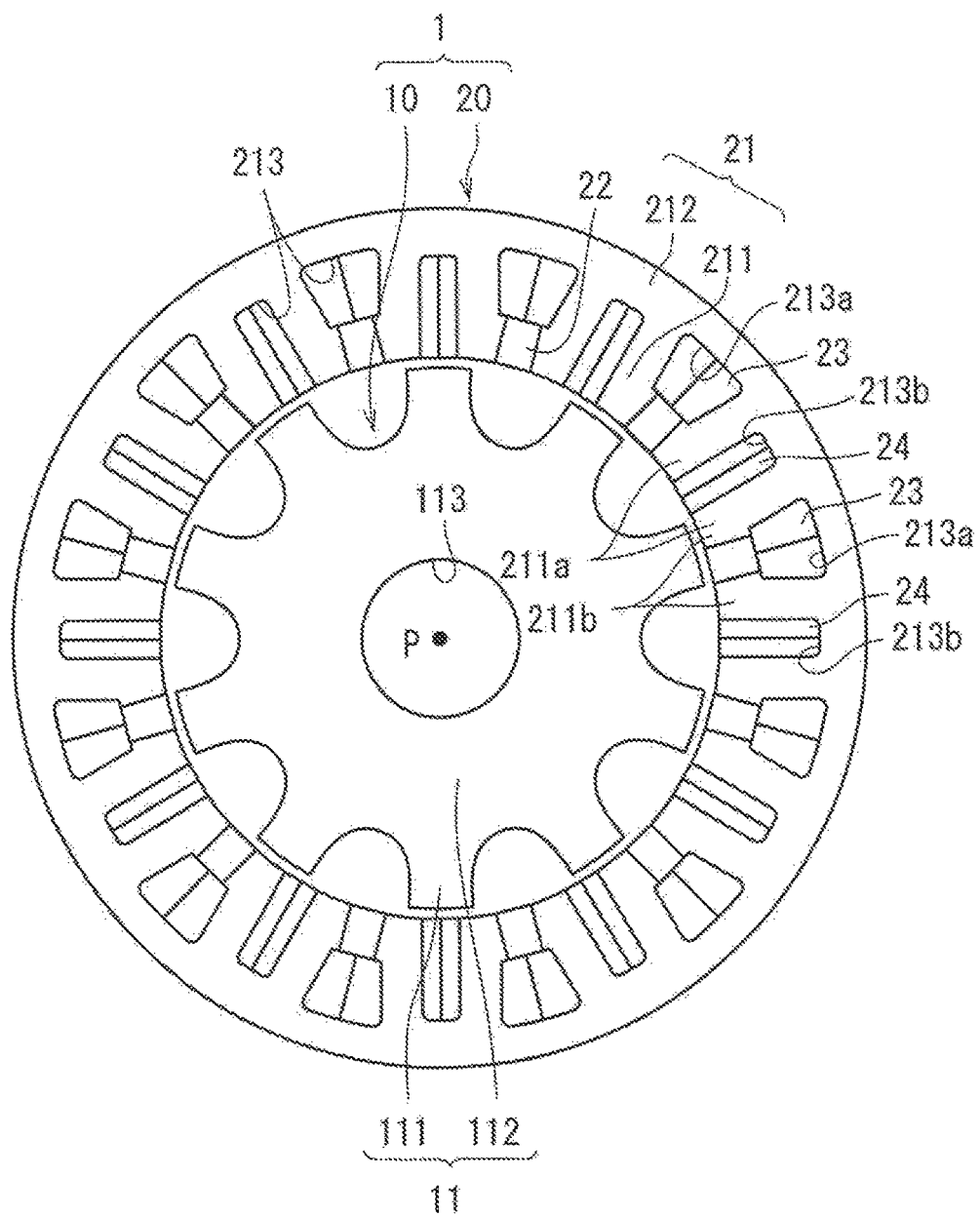
FIG. 1 is a sectional view of an example of a schematic configuration of an electric motor.

FIG. 1 is a sectional view of an example of a schematic configuration of an electric motor 1, illustrating the configuration of the electric motor 1 in a section perpendicular to an imaginary axis of rotation P. The electric motor 1 is applicable to, for example, a vehicle motor.

In the following description, the direction extending along the axis of rotation P is referred to as an axial direction, and a circumferential direction and a radial direction with respect to the axis of rotation P are merely referred to as a circumferential direction and a radial direction, respectively.

The electric motor 1 includes a rotor 10 and a stator 20. The rotor 10 and the stator 20 face each other with an air gap therebetween in the radial direction. In the illustration of FIG. 1, the stator 20 faces the rotor 10 opposite the axis of rotation P (near the outer periphery). The electric motor 1 is a so-called inner-rotor motor.

The rotor 10 includes a rotor core 11. The rotor core 11 is made of a soft magnetic material and includes projections 111 and a rotor yoke 112. The projections 111 are spaced side by side along the circumferential direction and project toward the stator 20 in the radial direction. The rotor yoke 112 magnetically couples ends of the projections 111 that are opposite to the stator 20 with one another in the circumferential direction. The rotor core 11 has a gear shape when viewed along the axial direction.

In the illustration of FIG. 1, the rotor yoke 112 has a through-hole 113 in the area including the axis of rotation P. The through-hole 113 passes through the rotor yoke 112 along the axial direction. A shaft (not shown) is inserted into the through-hole 113, and the rotor yoke 112 is fixed to the shaft. The through-hole 113 is not required in the case where, for example, a shaft is attached to end plates located at opposite sides of the rotor 10 in the axial direction.

The rotor core 11 may be formed of, for example, laminated steel plates that are laminated along the axial direction or may be a dust core including an insulating material. This reduces an eddy current generated in the rotor core 11.

The stator 20 includes a stator core 21, bonded magnets 22 for field magnets, field windings 23, and armature windings 24.

The stator core 21 is made of a soft magnetic material and includes a plurality of teeth 211 and a stator yoke 212. In the illustration of FIG. 1, an even number of teeth 211 are provided, which are arranged around the axis of rotation P. More specifically, the teeth 211 are spaced along the circumferential direction, which are arranged radially about the axis of rotation P.

The stator yoke 212 magnetically couples ends (ends opposite the rotor 10) of the teeth 211 to one another. The stator yoke 212 has, for example, an approximately tubular shape about the axis of rotation P. In the stator core 21 are formed spaces (hereinbelow, referred to as slots) 213 between the teeth 211 in the circumferential direction. In the illustration of FIG. 1, since an even number of teeth 211 are provided, an even number of slots 213 are formed as well.

The stator core 21 may be formed of, for example, laminated steel plates laminated along the axial direction, or may be a dust core including an insulating material. This reduces an eddy current generated in the stator core 21.

The bonded magnets 22 for field magnets are magnets each formed of a mixture of an insulating resin (adhesive) and a magnetic piece (magnet powder). The plurality of bonded magnets 22 are arranged in a plurality of field slots 213a among the slots 213. In the illustration of FIG. 1, the field slots 213a are slots that are adjacent to each other every other slot in the circumferential direction among the slots 213. The plurality of bonded magnets 22 are arranged such that their magnetic pole faces of the same polarity face each other in the circumferential direction. That is to say, the bonded magnets 22 are magnetized approximately along the circumferential direction, and the opposing faces of the bonded magnets 22 adjacent to each other in the circumferential direction are magnetic pole faces of the same polarity. In other words, the plurality of bonded magnets 22 are arranged such that magnetic pole faces of different polarities are alternately directed toward one side in the circumferential direction.

The field windings 23 are wound around the teeth 211 in the field slots 213a. More specifically, the field winding 23 is wound around a pair of teeth 211 (hereinbelow, also referred to as a pair of field teeth 211a) sandwiched between the field slots 213a adjacent to each other in the circumferential direction. That is to say, the field winding 23 is concentratedly wound around the pair of field teeth 211a, which are regarded as one tooth. The field winding 23 is wound around the pair of field teeth 211a, with its winding axis being an axis that extends along the radial direction.

As described above, the bonded magnet 22 and the field winding 23 are arranged in the field slot 213a, and the field winding 23 is adjacent to the bonded magnet 22 in the radial direction. In the illustration of FIG. 1, the bonded magnet 22 is arranged at the side close to the rotor 10 with respect to the field winding 23.

A DC current flows through the field winding 23 subjected to DC excitation. The direction of the DC current flowing through the field winding 23 depends on the polarity of the bonded magnet 22 adjacent to the field winding 23. The direction of the DC current will be described below in detail.

The armature windings 24 are wound around the teeth 211 in the armature slots 213b among the slots 213 except for the field slots 213a. The armature slots 213b are slots located between the field slots 213a among the slots 213. That is to say, the teeth 211 define the field slots 213a and the armature slots 213b alternately in the circumferential direction. The armature winding 24 is wound around a pair of teeth 211 (hereinbelow, also referred to as armature teeth 211b) sandwiched between a pair of armature slots 213b adjacent to each other in the circumferential direction. That is to say, the armature winding 24 is concentratedly wound around the pair of armature teeth 211b, which are regarded as one tooth. The armature winding 24 is also wound around the pair of armature teeth 211b, with its winding axis being an axis that extends along the radial direction.

When the stator 20 is viewed along the radial direction, the bonded magnet 22 is located inside the armature winding 24.

An AC current flows through the armature winding 24 subjected to AC excitation. Appropriately flowing an AC current through the armature winding 24 allows the armature winding 24 to supply a rotating field to the rotor 10. The rotor core 11 rotates about the axis of rotation P in accordance with the rotating field.

It is noted that the armature winding 24 and the field winding 23 do not refer to individual leads constituting these windings but refer to leads bound into a single group. The same also applies to the drawings. Leader lines at the start and end of winding and connections thereof are omitted in the drawings.

DC Excitation of Field Winding

Figure 2:
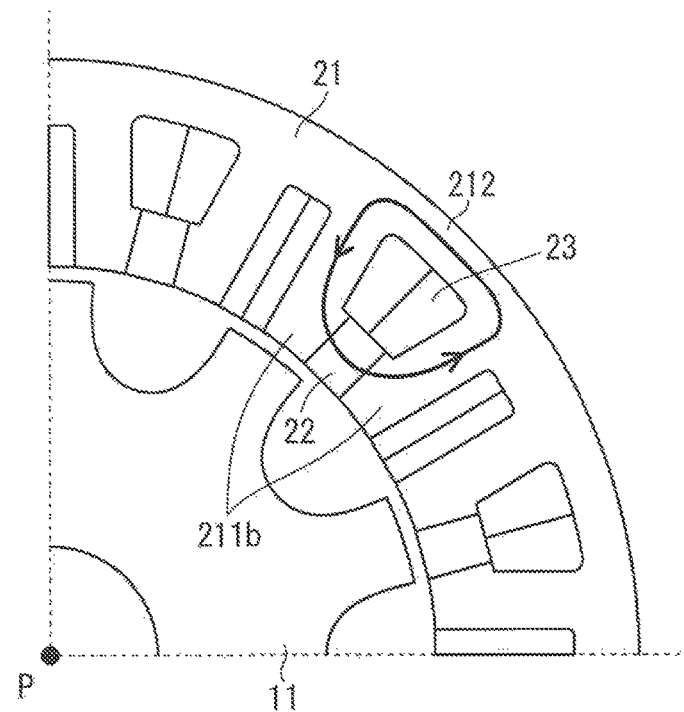
FIG. 2 is a view for explaining a flow of a magnetic flux.
Figure 3:
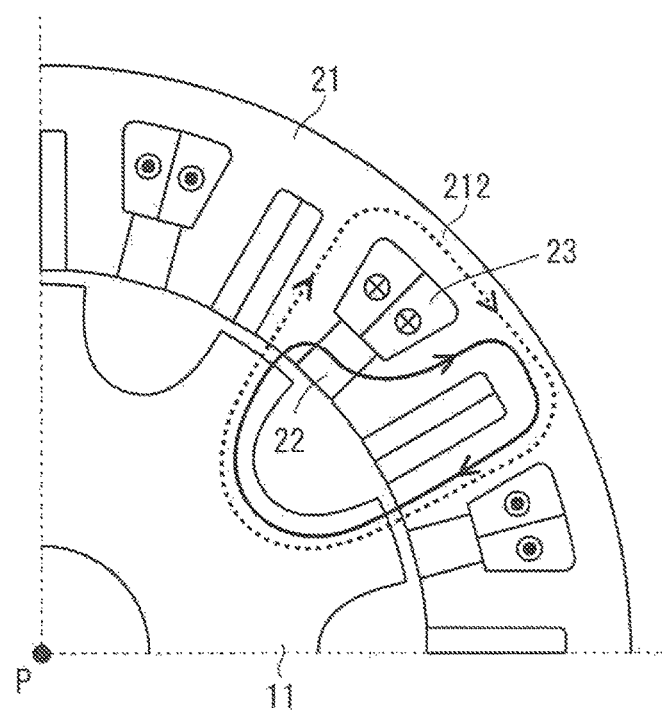
FIG. 3 is a view for explaining a flow of a magnetic flux.

FIGS. 2 and 3 schematically illustrate an example of how a magnetic flux flows. FIGS. 2 and 3 illustrate a part of the electric motor 1 in a section perpendicular to the axis of rotation P, more specifically, illustrate a quarter of the electric motor 1 about the axis of rotation P. With reference to FIG. 2, with no current flowing through the field winding 23, a flow of a magnetic flux of the bonded magnet 22 (hereinbelow, also referred to as a magnet magnetic flux) is indicated by a solid arrow. With reference to FIG. 3, the magnet magnetic flux of the bonded magnet 22 and the magnetic flux by the field winding 23 (hereinbelow, also referred to as a winding magnetic flux) are respectively indicated by a solid arrow and a dashed arrow.

As illustrated in FIG. 2, with no current flowing through the field winding 23, most of the magnet magnetic flux flows via a pair of armature teeth 211b and a part of the stator yoke 212 (a portion adjacent to the field winding 23 in the radial direction). In this case, thus, a small amount of magnetic flux flows from the stator core 21 to the rotor core 11.

When a current flows through the field winding 23, the current causes a winding magnetic flux to flow as illustrated in FIG. 3. In this case, a DC current flows through the field winding 23 such that a magnet magnetic flux flows via the rotor core 11 (see FIG. 3). In other words, a current flows through the field winding 23 such that a magnet magnetic flux does not pass through the part of the stator yoke 212. Thus, a current may flow through the field winding 23 as follows: a current may flow through the field winding 23 such that a winding magnetic flux flows in the direction opposite to that of the magnet magnetic flux of FIG. 2. With reference to FIG. 3, the direction of the current flowing through the field winding 23 is indicated by known symbols (circle symbols with a black dot inside thereof and circle symbols with×inside thereof).

The flows of the magnet magnetic flux and the winding magnetic flux of FIG. 3 are merely examples. Depending on the position at which the rotor core 11 rotates (the position of the projection 111), the magnet magnetic flux and the winding magnetic flux can flow through different paths. It is noted that even when the position at which the rotor core 11 rotates changes, the magnet magnetic flux and the winding magnetic flux flow via the rotor core 11.

As described above, the magnet magnetic flux and the winding magnetic flux flow via the rotor core 11 and act as field magnetic fluxes. Thus, controlling a DC current flowing through the field winding 23 can control the magnitude of the field magnetic flux. For example, in a low-speed rotation, field-strengthening control can be performed in which the magnitude of a field magnetic flux is increased to output high torque, in a high-speed rotation, field-weakening control is performed in which the magnitude of a field magnetic flux can be reduced to improve rotational speed.

The DC current flowing through the field winding 23 is controlled by, for example, a chopper circuit such as a step-down circuit, a booster circuit, or a booster/step-down circuit. More specifically, the chopper circuit produces a DC voltage to be applied to the field winding 23. The chopper circuit includes a switching element and controls a DC voltage by appropriately switching on or off the switching element.

The DC current flowing through the field winding 23 thus contains a harmonic content associated with on/off of the switching element. The harmonic content of the DC current causes a harmonic content of the winding magnetic flux. Such a harmonic content of a winding magnetic flux is not preferred because it causes an eddy current.

AC Excitation of Armature Winding

An AC current flows through the armature winding 24 as appropriate, so that a rotating field is applied to the rotor 10. For example, a three-phase armature winding is used as the armature winding 24, and a three-phase AC current flows through the armature winding 24. The AC current flowing through the armature winding 24 is controlled by, for example, an inverter. More specifically, the inverter produces an AC voltage (for example, a three-phase AC voltage) applied to the armature winding 24. The inverter includes a switching element and appropriately controls the amplitude and the frequency of an AC voltage by appropriately switching on or off the switching element.

Thus, the AC current flowing through the armature winding 24 mainly includes a fundamental content that causes a rotating field and a harmonic content associated with on/off of the switching element.

The magnetic flux of the armature winding 24 is an alternating magnetic flux, so that an eddy current is generated due to the alternative magnetic flux. A harmonic content is generated also in an alternating magnetic flux due to a harmonic content generated in an AC current. The harmonic content of the magnetic flux also causes an eddy current.

Bonded Magnet 22

As described above, the bonded magnets 22 are used as magnets for field magnets in the present embodiment. One of the main components of the bonded magnet 22 is an insulating resin (adhesive), resulting in a low conductivity of the bonded magnet 22. Thus, even when the magnetic flux (harmonic content) of the field winding 23 and the magnetic flux of the armature winding 24 flow through the bonded magnet 22, an eddy current generated in the bonded magnet 22 can be reduced.

The electric motor 1, which includes the bonded magnets 22 for field magnets in the stator 20, requires a lower strength of the magnet than in the case where magnets for field magnets are provided in the rotor 10. This is because the rotor 10 requires a relatively high strength due to a centrifugal force acting on the rotor 10 through rotation, whereas such a centrifugal force does not act on the stator 20. For this reason, inconvenience rarely occurs in strength even when the bonded magnets 22 having a low-strength are used.

In the illustration of FIG. 1, the bonded magnets 22 are in close contact with tips (portions near the rotor 10) of the teeth 211 in the circumferential direction. The magnetic fluxes of the bonded magnets 22 flow in the circumferential direction at boundaries between the bonded magnets 22 and the teeth 211, and accordingly, a decrease in the magnetic flux can be prevented or reduced more than in the structure in which air gaps are provided between the bonded magnets 22 and the teeth 211. The efficiency of the electric motor 1 can therefore be improved. Since the air gaps between the bonded magnets 22 and the teeth 211 are reduced, thus improving the strength of the stator 20.

Figure 4:
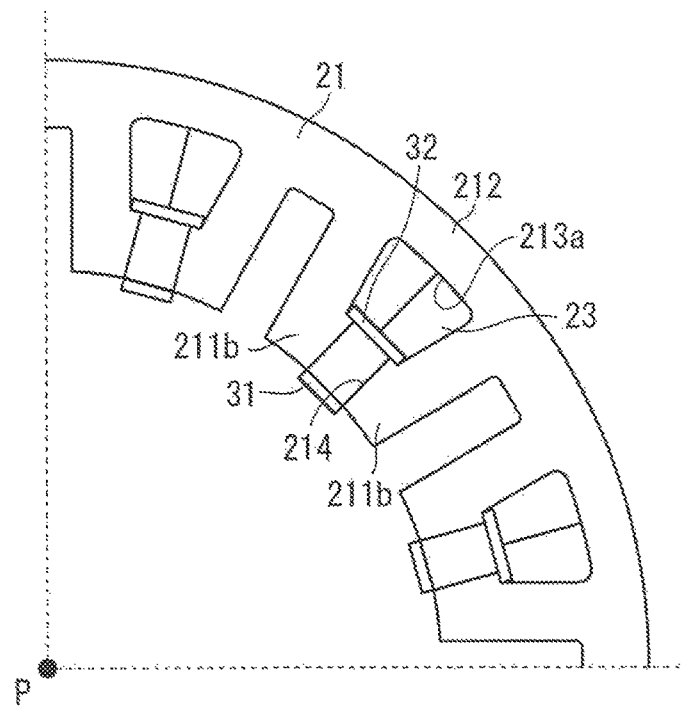
FIG. 4 is a partial sectional view of an example of the schematic configuration of the electric motor.

The bonded magnets 22 are produced through, for example, injection molding. First, a predetermined mold is fitted to the stator core 21. FIG. 4 illustrates a pair of portions 31 and 32 that are parts of the mold, and the pair of portions 31 and 32 are attached to the stator core 21 in each of the field slots 213a. The pair of portions 31 and 32 face each other with a space therebetween in the radial direction and form a magnet hole 214, in which the bonded magnet 22 is to be arranged, with a pair of armature teeth 211b (more specifically, portions adjacent to the bonded magnet 22 in the circumferential direction). The magnet hole 214 is closed at its opposite sides in the axial direction by portions (not shown) of the mold. An injection hole that communicates with the magnet hole 214 is provided in the mold.

Subsequently, a mixture of a liquid resin and magnet powder is poured through the injection hole into the magnet hole 214 under the application of pressure, and the resin is then cured. For example, the resin is a thermoplastic resin and is cooled to be cured. Needless to say, the resin is not limited to the thermoplastic resin and may be resins such as a thermosetting resin and a photocurable resin. Such injection molding can easily form the bonded magnets 22 by bringing these magnets into close contact with the teeth 211 (more specifically, the armature teeth 211b). Additionally, the mixture is magnetized in the circumferential direction with a predetermined magnetizer. Through these steps, the bonded magnets 22 can be formed.

The portions 31 located near the rotor 10 among the portions 31 and 32 may be continuous with each other in the circumferential direction.

In the illustration of FIG. 4, with the field winding 23 wound, the mold is attached to the stator core 21. This is because that, through the formation of the bonded magnet 22, the space in which the field winding 23 is arranged is closed in the radial direction by the bonded magnet 22. That is to say, it takes time to wind the field winding 23 in the space closed in the radial direction, and accordingly, the field winding 23 is wound in the space being open in the radial direction, that is, before the formation of the bonded magnet 22. This allows the field winding 23 to be wound easily.

Figure 5:
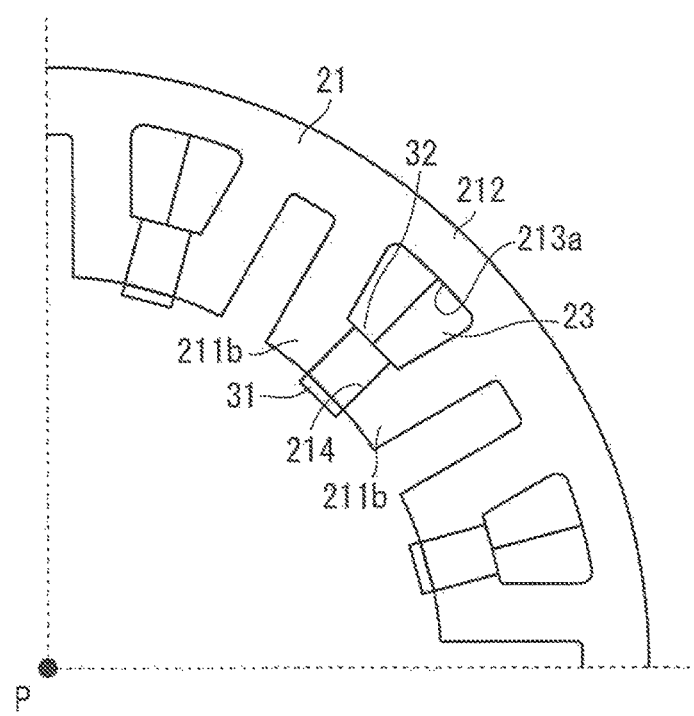
FIG. 5 is a partial sectional view of an example of the schematic configuration of the electric motor.

In the illustration of FIG. 5, no portion 32 is provided in the mold, and the magnet hole 214 is formed by the portion 31 of the mold, a pair of armature teeth 211b, and the field winding 23. In the illustration of FIG. 5, two field windings 23 are arranged in one field slot 213a, and accordingly, these two field windings 23 may be in close contact with or apart from each other in the circumferential direction. In the case where two field windings 23 are apart from each other, the magnet hole 214 is also present between the field windings 23. The space is closed by the stator yoke 212.

The steps similar to those described above are performed on the magnet hole 214, thus forming the bonded magnet 22. In this case, the bonded magnet 22 is in close contact not only with the armature teeth 211b but also with the field winding 23. This reduces an unnecessary space (the space between the bonded magnet 22 and the field winding 23), thus improving the efficiency of the electric motor 1. The field winding 23 is fixed to the bonded magnet 22, thus preventing or reducing winding collapse of the field winding 23.

Figure 6:
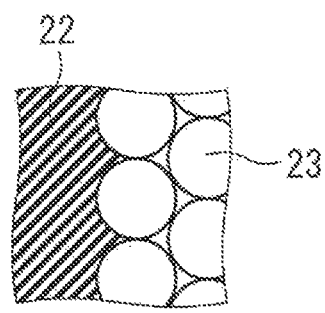
FIG. 6 is a schematic sectional view of an example of a bonded magnet and a field winding.
Figure 7:
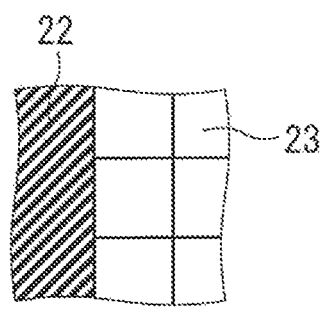
FIG. 7 is a schematic sectional view of an example of the bonded magnet and the field winding.

The field winding 23 may be formed of a lead wire (so-called flat wire) having a rectangular section. Ideally, the bonded magnet 22 and the field winding 23 are in close contact with each other in a plane. For example, in close contact of the bonded magnet 22 with the field winding 23 formed of a lead wire having a circular section, even when the field winding 23 is wound ideally, the bonded magnet 22 penetrates between, for example, adjacent lead wires (see FIG. 6). In this case, a thin portion is formed between the lead wires in the bonded magnet 22, and accordingly, a relatively large stress tends to occur in such a thin portion. In contrast, in the field winding 23 including the flat wire, ideally, the bonded magnet 22 and the field winding 23 are in close contact with each other in a plane (see FIG. 7). This avoids, or prevents or reduces such a stress concentration.

Another Electric Motor 1

Figure 8:
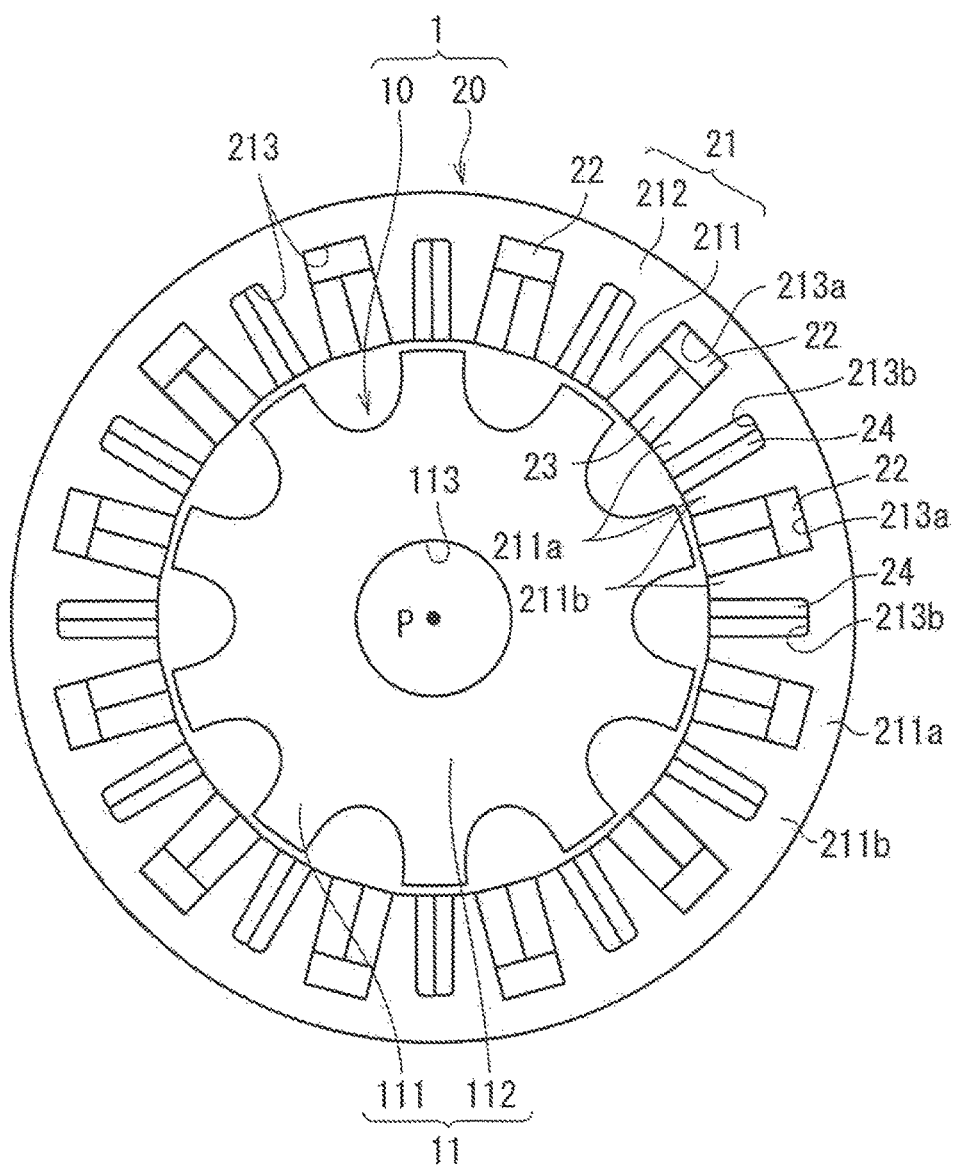
FIG. 8 is a sectional view of an example of a schematic configuration of an electric motor.

FIG. 8 illustrates an example of a schematic configuration of an electric motor 1. The electric motor 1 of FIG. 8 differs from the electric motor 1 of FIG. 1 in relative positions of the bonded magnets 22 and the field windings 23. In the electric motor 1 of FIG. 8, the bonded magnets 22 are opposite to the rotor 10 with respect to the field windings 23.

In the electric motor 1, a DC current flows through the field winding 23 such that the magnetic flux of the bonded magnet 22 adjacent to the field winding 23 does not flow through a part of the stator yoke 212 (a portion adjacent to the bonded magnet 22 in the radial direction). Controlling this DC current controls the magnitude of the field magnetic flux.

The bonded magnets 22 for field magnets are used also in this electric motor 1, thus reducing an eddy current generated in the bonded magnet 22.

Second Embodiment

Figure 9:
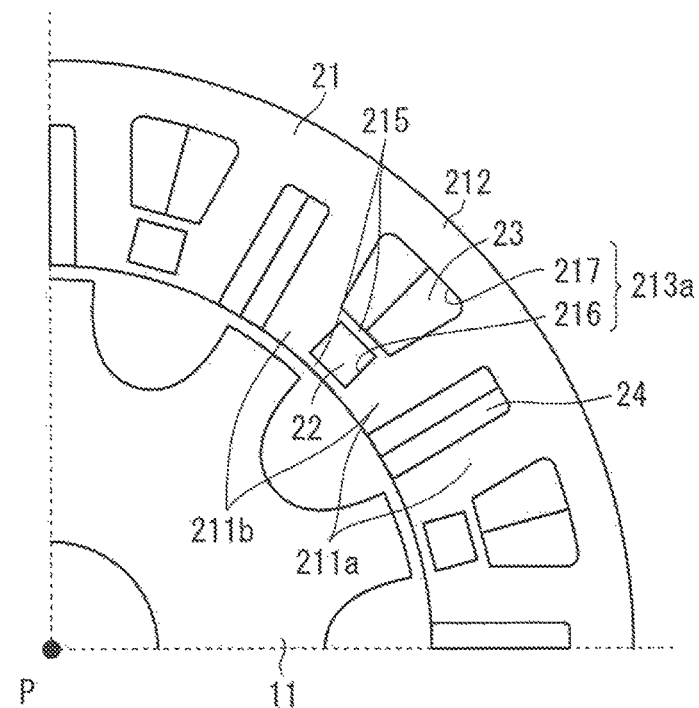
FIG. 9 is a partial sectional view of a schematic configuration of an electric motor.

FIG. 9 is a sectional view of an example of a schematic configuration of an electric motor 1 according to a second embodiment. The electric motor 1 of FIG. 9 differs from the electric motor 1 of FIG. 1 in the shape of the stator core 21.

In the illustration of FIG. 9, the stator core 21 further includes pairs of coupling portions 215. The pair of coupling portions 215 are provided in each of the field slots 213a and couple a pair of armature teeth 211b adjacent to each other in the circumferential direction. As illustrated in FIG. 9, accordingly, the pair of coupling portions 215 divide the field slot 213a into a magnet hole 216 and a winding hole 217. Both the magnet hole 216 and the winding hole 217 are closed holes when viewed along the axial direction.

The magnet hole 216 is formed by a pair of coupling portions 215 and a pair of armature teeth 211b. The magnet hole 216 is surrounded by the stator core 21 in the section perpendicular to the axis of rotation P. In other words, the magnet bole 216 is closed in the direction perpendicular to the axis of rotation P. The bonded magnet 22 is arranged in the magnet hole 216. The pair of coupling portions 215 thus sandwich the bonded magnet 22 therebetween in the radial direction, and the pair of armature teeth 211b sandwich the bonded magnet 22 therebetween in the circumferential direction.

The pair of coupling portions 215 have such a small thickness in the radial direction as to be easily magnetically saturated. The coupling portions 215 can thus be referred to as thin-wall portions as well. The coupling portions 215 are easily magnetically saturated as described above, thus preventing or reducing magnetic short-circuit of the pair of armature teeth 211b adjacent to each other with the coupling portions 215 therebetween.

The stator core 21 is effective particularly in the formation of the bonded magnets 22 through injection molding. This is because the magnet hole 216 is surrounded by the stator core 21, thereby preventing a leakage of the mixture in the section without attaching another mold to the stator core 21. In order to prevent a leakage of the mixture, thus, the mold needs to close an opening alone of the magnet hole 216 in the axial direction. The shape of the mold can thus be simplified. For example, the pair of portions 31 and 32, which have been described with reference to FIG. 4, are not required.

The coupling portion 215 has rigidity higher than that of the bonded magnet 22, leading to improvement in the strength of the stator 20.

In the stator core 21, the winding hole 217 in which the field winding 23 is arranged is also surrounded by the stator core 21 in the section. More specifically, the winding hole 217 is surrounded by the stator yoke 212, a pair of armature teeth 211b, and the coupling portion 215 of the pair of coupling portions 215 that is located between the bonded magnet 22 and the field winding 23. For example, the field winding 23 can be arranged in the winding hole 217 as follows. That is to say, in one example, one lead wire may alternately pass through the pair of winding holes 217 adjacent to each other in the circumferential direction by an amount twice the number of turns in field windings 23 to be wound. Such winding method, however, requires effort and time.

For the above reason, the field winding 23 is desirably a so-called segment conductor coil. For example, U-shaped conductors are first inserted into a pair of winding holes 217 adjacent to each other in the circumferential direction. Herein, "U-shaped" refers to the shape of the conductor when viewed along the radial direction. These conductors are coupled to each other at one end, thus forming the field winding 23.

Figure 10:
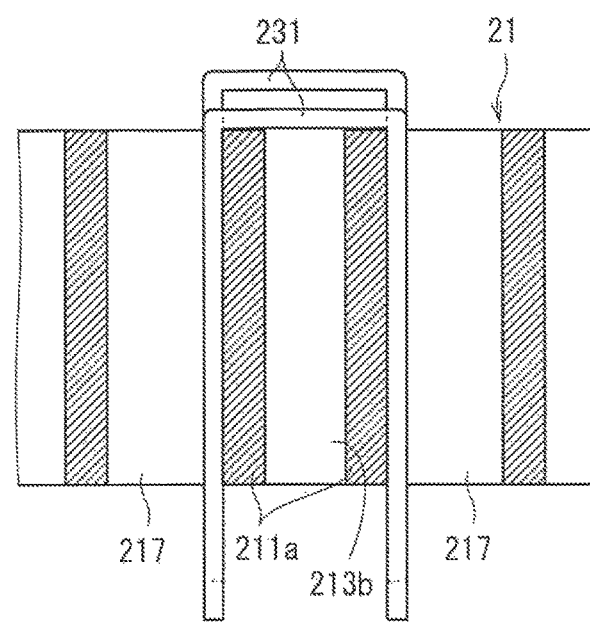
FIG. 10 is a schematic view of how field windings are inserted into magnet holes.

For example, these conductors are designed to have a dimension larger than the dimension of the stator core 21 in the axial direction. This allows the opposite ends of the conductor to project from the stator core 21. FIG. 10 is a schematic sectional view of how the U-shaped conductors 231 are inserted into the winding holes 217. FIG. 10 illustrates a section extending along the circumferential direction, illustrating two conductors 231. Although the conductor 231 facing away from the viewer in FIG. 10 is located higher than the conductor 231 facing the viewer in FIG. 10, they are inserted into the winding holes 217 to a similar extent.

The portions projecting from the stator core 21 are bent appropriately toward, for example, the armature slot 213b sandwiched between a pair of field teeth 211a, around which the field winding 23 is to be wound, in the circumferential direction, thereby appropriately coupling the conductors at one end through, for example, welding. As a result, the conductors are coupled to each other at one end such that one conductor is wound around a pair of field teeth 211a, where the one conductor is composed of a plurality of conductors. With reference to FIG. 10, for example, the right end of the conductor 231 facing the viewer is coupled with the left end of the conductor 231 facing away from the viewer.

In this manner, the field winding 23 is formed of conductors 231 that pass through the field slots 213a (winding holes 217) adjacent to each other in the circumferential direction and have opposite ends at one side in the axial direction. The conductors 231 can pass through the winding holes 217 from one direction at a time, and thus, even when the winding hole 217 is surrounded by the stator core 21, the field winding 23 can be easily attached to the field tooth 211a. For example, the technique described in Japanese Patent Application Laid-Open No. 2004-222458 is applicable to such a segment conductor coil.

Figure 11:
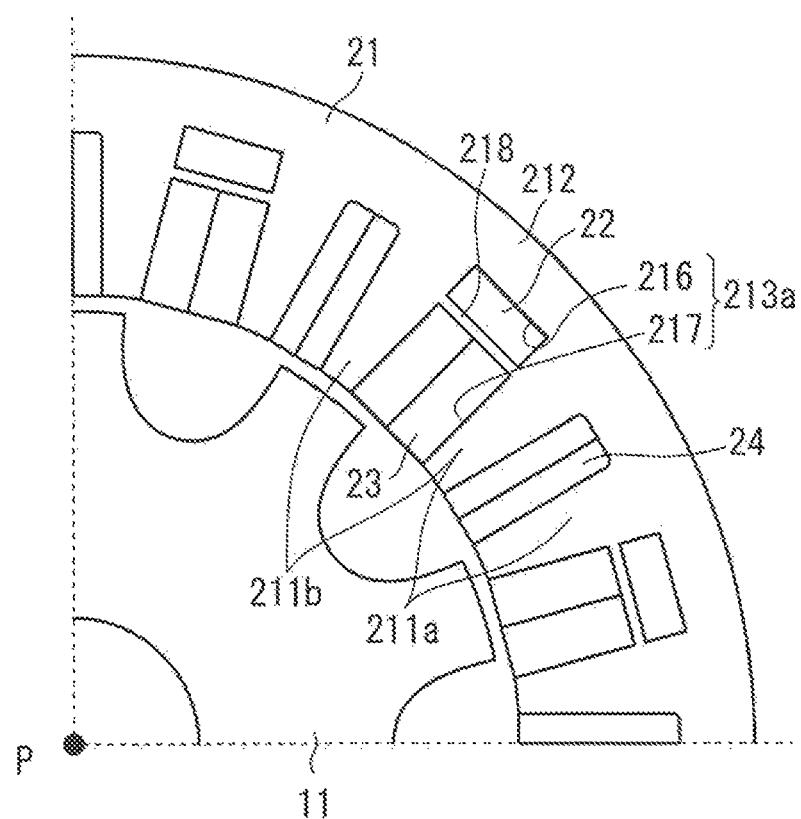
FIG. 11 is a partial sectional view of an example of a schematic configuration of an electric motor.

An electric motor 1 of FIG. 11 differs from the electric motor 1 of FIG. 8 in the shape of the stator core 21. In the illustration of FIG. 11, the stator core 21 further includes coupling portions 218. The coupling portion 218 couples a pair of armature teeth 211b adjacent to each other in the circumferential direction. Consequently, as illustrated in FIG. 11, the coupling portion 218 divides the field slot 213a into the magnet hole 216 and the winding hole 217.

The magnet hole 216 is formed by the coupling portion 218, a pair of armature teeth 211b, and the stator yoke 212. The magnet hole 216 is also surrounded by the stator core 21 in the section perpendicular to the axis of rotation P. The bonded magnet 22 is arranged in the magnet hole 216. The coupling portion 218 accordingly sandwiches the bonded magnet 22 between the stator yoke 212 and itself in the radial direction.

The coupling portion 218 has such a small thickness along the radial direction as to be easily magnetically saturated. The coupling portion 218 can thus be referred to as a thin-wall portion as well. Since the coupling portion 218 is so thin as to be easily magnetically saturated, thus preventing or reducing magnetic short-circuit of a pair of armature teeth 211b adjacent to each other with the coupling portion 218 therebetween.

The stator core 21 is effective particularly in the formation of the bonded magnets 22 through injection molding. This is because the magnet holes 216 are surrounded by the stator core 21, thus preventing a leakage of the mixture in the section. The mold can thus be simplified.

In the illustration of FIG. 11, the winding hole 217 in which the field winding 23 is arranged is open toward the rotor 10 in the radial direction. The winding hole 217, which is open toward the rotor 10 as described above, allows the field winding 23 to be easily wound around a pair of field teeth 211a.

The above embodiments of the present invention can be appropriately modified or omitted as long as they are consistent with each other.

While the electric motor has been shown and described in detail, the foregoing description is in all aspects illustrative and not restrictive. It is therefore understood that numerous modifications and variations can be devised without departing from the scope of the invention.

What is claimed is:
1. An electric motor comprising:
a rotor; and
a stator facing said rotor with an air gap formed therebetween in a radial direction about an axis of rotation, said stator including
a stator core having
a plurality of teeth alternately defining field slots and armature slots along a circumferential direction around said axis of rotation, and
a stator yoke magnetically coupling said plurality of teeth opposite said rotor,
a plurality of armature windings with each armature winding wound around two of said teeth sandwiched between an adjacent pair of said armature slots along said circumferential direction,
a plurality of field windings with each field winding wound around two of said teeth sandwiched between an adjacent pair of said field slots along said circumferential direction, and
a plurality of bonded magnets acting as field magnets individually located in said field slots while opposing said field windings in said radial direction, each adjacent pair of said plurality of bonded magnets along said circumferential direction respectively having an adjacent pair of pole surfaces, with said adjacent pair of pole surfaces having a same polarity.

2. The electric motor according to claim 1, wherein said bonded magnets are in close contact with said teeth in said circumferential direction.

3. The electric motor according to claim 1, wherein a magnet hole of each of said field slots in which each of said bonded magnets is arranged is surrounded by said stator core when viewed along said axis of rotation.

4. The electric motor according to claim 1, wherein said field windings are disposed on a side opposite to said rotor with respect to said bonded magnets,
said stator core further includes a coupling portion coupling adjacent teeth of said teeth along said circumferential direction between each of said field windings and each of said bonded magnets in said radial direction,
each of said field windings includes a plurality of conductors passing through said field slots adjacent to each other in said circumferential direction and having opposite ends at one side in a direction extending along said axis of rotation, and
one end of one of said conductors is coupled with one end of the other of said conductors.

5. The electric motor according to claim 1, wherein said bonded magnets are in close contact with said field windings in said radial direction.

6. The electric motor according to claim 5, wherein each of said field windings includes a lead wire having a rectangular section.

7. The electric motor according to claim 2, wherein a magnet hole of each of said field slots in which each of said bonded magnets is arranged is surrounded by said stator core when viewed along said axis of rotation.

8. The electric motor according to claim 2, wherein said field windings are disposed on a side opposite to said rotor with respect to said bonded magnets,
said stator core further includes a coupling portion coupling adjacent teeth of said teeth along said circumferential direction between each of said field windings and each of said bonded magnets in said radial direction,
each of said field windings includes a plurality of conductors passing through said field slots adjacent to each other in said circumferential direction and having opposite ends at one side in a direction extending along said axis of rotation, and
one end of one of said conductors is coupled with one end of the other of said conductors.

9. The electric motor according to claim 5, wherein said field windings are disposed on a side opposite to said rotor with respect to said bonded magnets,
said stator core further includes a coupling portion coupling adjacent teeth of said teeth along said circumferential direction between each of said field windings and each of said bonded magnets in said radial direction,
each of said field windings includes a plurality of conductors passing through said field slots adjacent to each other in said circumferential direction and having opposite ends at one side in a direction extending along said axis of rotation, and
one end of one of said conductors is coupled with one end of the other of said conductors.

10. The electric motor according to claim 2, wherein said bonded magnets are in close contact with said field windings in said radial direction.

\* \* \* \* \*